(12) United States Patent
Minoshima (10) Patent No.: US 10,760,900 B2
(45) Date of Patent: Sep. 1, 2020

(54) SHAPE MEASUREMENT METHOD AND SHAPE MEASUREMENT DEVICE

(71) Applicant: The University of Electro-Communications, Tokyo (JP)

(72) Inventor: Kaoru Minoshima, Tokyo (JP)

(73) Assignee: The University of Electro-Communications, Tokyo (JP)

( * ) Notice: Subject to any disclaimer, the term of this patent is extended or adjusted under 35 U.S.C. 154(b) by 121 days.

(21) Appl. No.: 16/081,216

(22) PCT Filed: Dec. 21, 2016

(86) PCT No.: PCT/JP2016/088196
§ 371 (c)(1),
(2) Date: Aug. 30, 2018

(87) PCT Pub. No.: WO2017/149912
PCT Pub. Date: Sep. 8, 2017

(65) Prior Publication Data
US 2019/0086197 A1 Mar. 21, 2019

(30) Foreign Application Priority Data
Mar. 2, 2016 (JP) ................................. 2016-040061

(51) Int. Cl.
*G01B 11/24* (2006.01)
*G01S 17/10* (2020.01)
(Continued)

(52) U.S. Cl.
CPC ........ *G01B 11/2441* (2013.01); *G01B 9/0201* (2013.01); *G01B 9/02008* (2013.01);
(Continued)

(58) Field of Classification Search
CPC .............. G01B 9/02008; G01B 9/0201; G01B 9/02014; G01B 11/24; G01B 11/2441; G01S 17/06; G01S 17/10; G01S 17/89
See application file for complete search history.

(56) References Cited

U.S. PATENT DOCUMENTS

| | | | | |
|---|---|---|---|---|
| 6,064,481 A * | 5/2000 | Matsumoto | ........ | G01B 9/02028 356/511 |
| 2013/0063728 A1* | 3/2013 | Kuramoto | .......... | G01B 9/02008 356/484 |
| 2013/0342849 A1* | 12/2013 | Shioda | ............... | G01B 11/2441 356/511 |

FOREIGN PATENT DOCUMENTS

| JP | 07-229725 | 8/1995 |
|---|---|---|
| JP | 2000-074637 | 3/2000 |

(Continued)

OTHER PUBLICATIONS

English translation of JP 07-229725. Obtained from ESPACENET on Feb. 27, 2020. (Year: 2020).*

(Continued)

*Primary Examiner* — Michael A Lyons
(74) *Attorney, Agent, or Firm* — Meunier Carlin & Curfman LLC (57) ABSTRACT

A shape measurement method of the present invention includes: a step of irradiating a measurement object with an optical pulse train in which a plurality of optical pulses that have predetermined frequency distributions on a time axis are disposed chronologically in numerical order; and a step of measuring an optical shape of the measurement object in accordance with a correspondent relation between numbers of the optical pulses of a plurality of detection target optical pulse trains after the emitted optical pulse train acts on the (Continued)

measurement object and a correspondent relation between the frequency distributions in the optical pulses.

11 Claims, 5 Drawing Sheets

(51) Int. Cl.
  *G01B 9/02* (2006.01)
  *G01S 17/89* (2020.01)
(52) U.S. Cl.
  CPC .......... *G01B 9/02014* (2013.01); *G01S 17/10* (2013.01); *G01S 17/89* (2013.01)

(56) References Cited

FOREIGN PATENT DOCUMENTS

| JP | 2003-126044 | 5/2003 |
| JP | 2011-13104 | 1/2011 |
| JP | 2012-132711 | 7/2012 |

OTHER PUBLICATIONS

International Preliminary Report on Patentability (English) dated May 22, 2018, from International Application No. PCT/JP2016/088196, 11 pages.
Nakamura K et al: "Optical Frequency Domain Ranging by a Frequency-Shifted Feedback Laser". IEEE Journal of Quantum Electronics, IEEE Service Center, Piscataway, NJ, USA, vol. 36, No. 3, Mar. 1, 2000 (Mar. 1, 2000), pp. 305-316, XP011449663, ISSN: 0018-9197, DOI: 10.1109/3.825877.
Jonghan Jin: "Dimensional metrology using the optical comb of a mode-locked laser", Measurement Science and Technology, IOP, Bristol, GB, vol. 27, No. 2, Dec. 31, 2015 (Dec. 31, 2015), p. 22001, XP020297286, ISSN: 0957-0233, DOI: 10.1088/0957-0233/27/2/022001 [retrieved on Dec. 31, 2015].
Extended European Search Report dated Oct. 7, 2019, relating to European Application No. 16892746.5. (7 pages.).
International Search Report dated Feb. 21, 2017, from International Application No. PCT/JP2016/088196, 2 pages.

* cited by examiner

SHAPE MEASUREMENT METHOD AND SHAPE MEASUREMENT DEVICE

TECHNICAL FIELD

The present invention relates to a shape measurement method and a shape measurement device. This application is a 371 of PCT/JP2016/088196 filed Dec. 21, 2018, which claims priority to Japanese Patent Application No. 2016-040061, filed Mar. 2, 2016, the contents of which are incorporated herein by reference.

BACKGROUND ART

Methods of measuring shapes or the like measurement targets (measurement objects) using light have excellent characteristics of non-contact and non-destruction, and thus applications of the methods to industry and medical fields and fields of basic sciences are expected. As shape measurement devices using light, for example, various methods such as a method called a so-called moiré method of using a coded pattern of light and a method based on a ranging technique have been proposed.

For example, Patent Document 1 discloses a 3-dimensional measurement device that includes chirped optical pulse generation means for generating a chirped optical pulse of which a color is regularly changed over time and 3-dimensional information acquisition means for acquiring the chirped light from the chirped light generation means via a measurement object and forming 2-dimensional information of reflected light at a measurement standard time at which the chirped light is acquired into 3-dimensional information based on light color. In the 3-dimensional measurement device, acquisition light can be obtained via a measurement object when the measurement object is irradiated with the chirped optical pulse generated by the chirped light generation means. The color information of the acquisition light acquired by the 3-dimensional information acquisition means at the measurement standard time is related to a 3-dimensional shape of the measurement object.

As another shape measurement technology, for example, Patent Document 2 discloses a 3-dimensional shape measurement method (a shape measurement method) of measuring a distance to a measurement target using a time from emission of light to the measurement target to detection of a reflected image and coding a sequence of the emitted light and performing distance measurement by decoding the reflected image of the coded light. In the 3-dimensional shape measurement method, planar light or substantially planar light is used as light emitted to the measurement target. The sequence of the light is coded by changing the wavelength of the emitted light or an emission timing of the light.

CITATION LIST

Patent Document

[Patent Document 1]
Japanese Unexamined Patent Application, First Publication No. Hei 7-229725
[Patent Document 2]
Japanese Unexamined Patent Application, First Publication No. 2000-074637

SUMMARY OF INVENTION

Technical Problem

However, a nanometer (nm=$10^{-9}$ m)-order measurement resolution can be obtained in the shape measurement method disclosed in Patent Document 1, there is a problem that it is difficult to realize both the measurement resolution and a measurement range (for example, meter (m) order) relatively larger than the measurement resolution. Accordingly, in the shape measurement method disclosed in Patent Document 1, in order to measure an optical shape of a measurement object in which an nm-order minute structure is formed on an optical surface which changes on a m order for example, it is necessary to combine the shape measurement method disclosed in Patent Document 1 with another measurement technology for measuring a change in the optical surface.

In the 3-dimensional measurement method disclosed in Patent Document 2, there is a problem that it is difficult to realize a femtosecond (fs=$10^{-15}$ s)-order time resolution because of the nature in which a time from emission of light to a measurement target to detection of a reflected image is used.

The invention provides a shape measurement method and a shape measurement device capable of realizing a nanometer-order measurement resolution, a meter-order measurement range, and a femtosecond-order time resolution.

Solution to Problem

According to an aspect of the invention, a shape measurement method includes: a step of irradiating a measurement object with an optical pulse train in which a plurality of optical pulses that have predetermined frequency distributions on a time axis are disposed chronologically in numerical order; and a step of measuring an optical shape of the measurement object in accordance with a correspondent relation between numbers of the optical pulses of a plurality of detection target optical pulse trains after the emitted optical pulse train acts on the measurement object and a correspondent relation between the frequency distributions in the optical pulses.

In the above-described shape measurement method, the optical pulse train may be obtained by controlling a phase of a discrete mode frequency of an optical comb.

In the above-described shape measurement method, the correspondent relation between the numbers of the optical pulses of the plurality of detection target optical pulse trains may be obtained using an interference signal generated when the detection target optical pulse train propagating in a propagation space with a predetermined optical path length interfere.

In the above-described shape measurement method, the plurality of optical pulses may be coherent with each other, phases of the optical pulses which are adjacent on the time axis may be different from each other, and the optical pulse train may act in different regions of the measurement object.

In the above-described shape measurement method, the optical pulse train may be expanded to a size of a measurement target portion of the measurement object before the measurement object is irradiated.

In the above-described shape measurement method, the correspondent relation between numbers of the optical pulses of a plurality of detection target optical pulse trains and the correspondent relation between the frequency distributions in the optical pulses may be obtained by cutting out the detection target optical pulse trains on a same surface that has an exit direction of the detection target optical pulse trains as a normal line instantaneously.

According to another aspect of the invention, a shape measurement device includes: a light source which irradiate a measurement object with an optical pulse train in which a plurality of optical pulses that have predetermined frequency distributions on a time axis are disposed chronologically in numerical order; and an optical shape measurement part which measure an optical shape of the measurement object in accordance with a correspondent relation between numbers of the optical pulses of a plurality of detection target optical pulse trains after the optical pulse train emitted from the light source acts on the measurement object and a correspondent relation between the frequency distributions in the optical pulses.

In the above-described shape measurement device, the light source may include an optical comb capable of emitting the optical pulse train by controlling a phase of a discrete mode frequency.

In the above-described shape measurement device, the plurality of optical pulses may be coherent with each other, phases of the optical pulses which are adjacent on the time axis may be different from each other, and the optical pulses may act in different regions of the measurement object.

In the above-described shape measurement device, the light source may include a beam expander configured to expands the optical pulse train to a size of a measurement target portion of the measurement object before the optical pulse train is irradiated the measurement object.

In the above-described shape measurement device, the optical shape measurement part is configured to obtain the correspondent relation between numbers of the optical pulses of a plurality of detection target optical pulse trains and the correspondent relation between the frequency distributions in the optical pulses, by cutting out the detection target optical pulse trains on a same surface that has an exit direction of the detection target optical pulse trains as a normal line instantaneously Advantageous Effects of Invention According to the aspects of the invention, for example, a wide-meter-order measurement range is realized by measuring an optical shape of a measurement object in accordance with a correspondent relation between the numbers of optical pulses of a plurality of detection target optical pulses. By appropriately setting a frequency distribution in an optical pulse and measuring an optical shape of a measurement object in accordance with a correspondent relation between predetermined frequency distributions of optical pulses of a plurality of detection target optical pulse trains, it is possible to obtain a shape measurement method and a shape measurement device capable of realizing a nanometer-order measurement resolution and a femtosecond-order time resolution.

BRIEF DESCRIPTION OF DRAWINGS

FIG. 4 is a schematic diagram showing modification examples of a frequency distribution changed over time in an optical pulse in the embodiment of the shape measurement method according to the present invention.

DESCRIPTION OF EMBODIMENTS

Hereinafter, embodiments of a shape measurement method and a shape measurement device according to the present invention will be described with reference to the drawings. The drawings used for the following description are schematic and ratios or the like of lengths, widths, and thicknesses may not be identical to actual ratios or the like and can be appropriately changed.

According to an embodiment, a shape measurement method includes: a step (hereinafter referred to as a first step) of irradiating a measurement object with an optical pulse train in which a plurality of optical pulses that have predetermined frequency distributions on a time axis is disposed chronologically in numerical order; and a step (hereinafter referred to as a second step) of measuring an optical shape of the measurement object in accordance with a correspondent relation between numbers of the optical pulses of a plurality of detection target optical pulse trains after the emitted optical pulses act on the measurement object and a correspondent relation between the frequency distributions in the optical pulses. Hereinafter, each process will be described.

(First Step)

An irradiation optical pulse train (optical pulse train) A0 used in the first step is not particularly limited as long as a plurality of optical pulses OP(k) (where k is an integer) that have predetermined frequency distributions on a time axis are disposed chronologically in the order of the number k (numerical order) (that is, OP(1), OP(2), . . . , OP(k) are disposed in order on a time axis). As a preferable irradiation optical pulse train, an optical pulse train obtained by controlling a plurality of discrete mode frequencies included in an optical comb (optical frequency comb) and an intensity or a phase between the adjacent discrete mode frequencies is an exemplary example.

As described above, by controlling a plurality of discrete mode frequencies included in an optical comb and the intensity or the phase between the adjacent discrete mode frequencies, it is possible to obtain a chirped optical pulse in which light with different frequencies is arranged on a time axis based on a predetermined rule or an optical pulse in which light with different frequencies are coded on a time axis based on a predetermined rule. By controlling a plurality of discrete mode frequencies included in the optical comb and the intensity or the phase between the adjacent discrete mode frequencies, it is possible to obtain a chirped optical pulse train or a coded optical pulse train in which the plurality of chirped optical pulses or coded optical pulses are disposed chronologically in the numerical order. For example, the chirped optical pulses are used to convert time information of ultrashort optical pulses into continuous frequency information (that is, color information) on a time axis.

Figure 1:
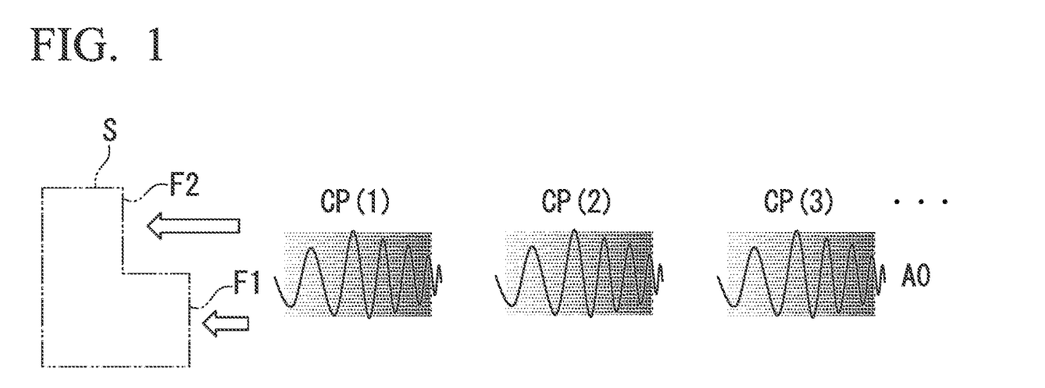
FIG. 1 is a schematic diagram showing a principle of an embodiment of a shape measurement method according to the present invention and a diagram showing a form in which a measurement object is irradiated with an optical pulse train.

As the optical pulse OP(k), a chirped optical pulse CP(k) is an exemplary example in which a frequency is continuously changed on a time axis is shown in FIG. 1.

Hereinafter, a case in which the chirped optical pulse train CP(k) obtained from an optical comb (not shown) is used as the optical pulse OP(k) is assumed in the description.

A relation expressed in Expression (1) is established between a time width τ of a pulse of an optical comb and an expansion Δv of a frequency.

[Math. 1]

$$\tau \geq \frac{1}{\Delta v} \quad (1)$$

Figure 2:
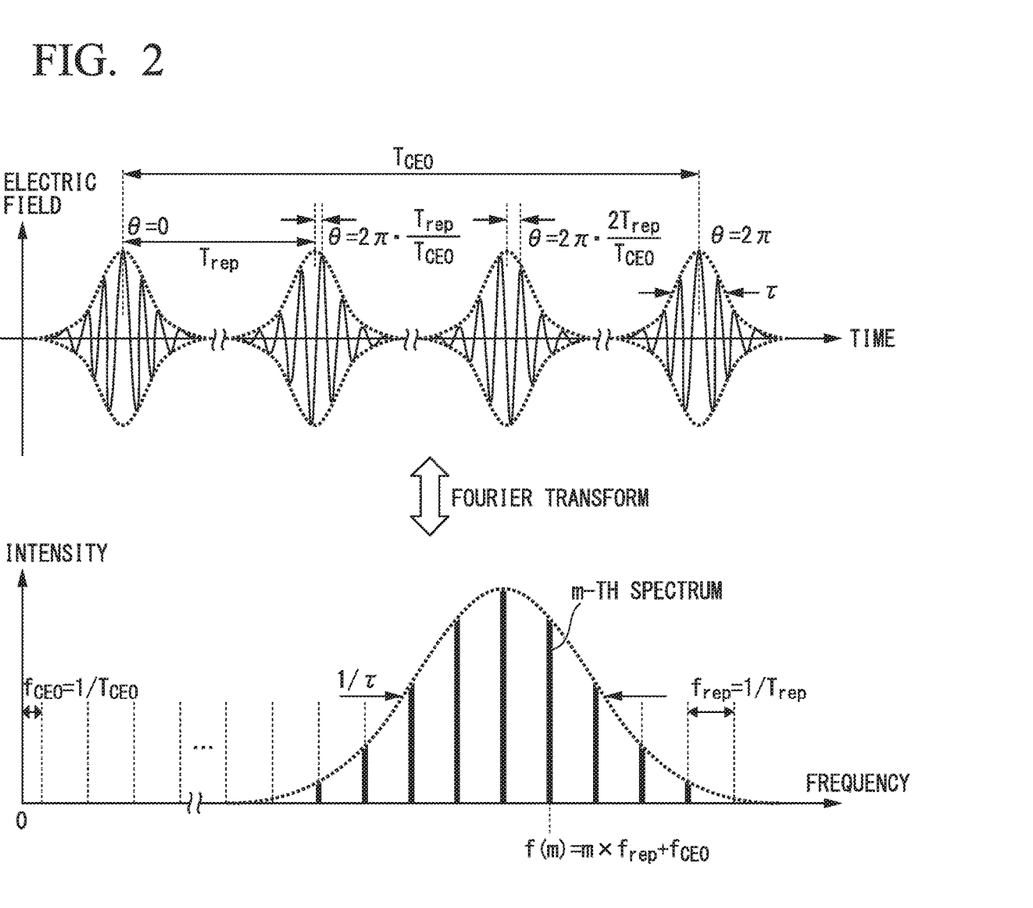
FIG. 2 is a schematic diagram showing a principle of an optical comb.

As shown in the upper part of FIG. 2, an ultrashort optical pulse train oscillated at a constant repetition time $T_{rep}$ has a constant frequency interval $f_{rep}$ from the viewpoint of a frequency. A relation expressed in Expression (2) is established between the repetition time $T_{rep}$ and the frequency interval $f_{rep}$.

[Math. 2]

$$f_{rep} = \frac{1}{T_{rep}} \quad (2)$$

Here, when many pulse trains are noticed, an optical pulse train is formed by superimposing many vertical modes propagating inside a resonator of a light source. The optical pulse train is formed by a carrier wave (also referred to as a carrier) which is a wave of the superimposition of the vertical modes and a wave packet forming an envelope line (also referred to as an envelope) of the carrier wave. In a region in which there is a dispersive medium such as an air, a carrier wave moves at a phase speed $v_p$ and a wave packet moves at a group speed $v_g$ different from the phase speed $v_p$. In this way, since the speeds of the carrier wave and the wave packet are different from each other, a phase difference occurs with the passage of time. A laser resonator includes a dispersive medium. Thus, a phase shift $\phi_{CEO}$ occurs between mutually adjacent pulses in a pulse train emitted repeatedly for each different time of the repetition time $T_{rep}$. The phase shift $\phi_{CEO}$ has one period in a time $T_{CEO}$. A relation expressed in Expression (3) is established among the repetition time $T_{rep}$, the time $T_{CEO}$, and the phase shift $\phi_{CEO}$.

[Math. 3]

$$T_{rep} = \left(\frac{\phi_{CEO}}{2\pi}\right) T_{CEO} \quad (3)$$

When the above-described ultrashort optical pulse train on a time axis is subjected to Fourier transform and is observed on a frequency axis, as shown in the lower part of FIG. 2, many spectra disposed at an interval of the repetition frequency $f_{rep}$ corresponding to a reciprocal of the time interval $T_{rep}$ are observed. In this way, the plurality of spectra disposed so that teeth of a comb are formed are an optical comb and a spectral width of the entire optical comb is equivalent to a reciprocal (1/τ) of the time width of the ultrashort optical pulse.

Specifically, as shown in the lower part of FIG. 2, when the spectrum of the optical comb is virtually extended from a center frequency to 0 (zero) Hz at the interval of the repetition frequency $f_{rep}$, there is a remaining frequency equal to or less than the repetition frequency $f_{rep}$ finally. The remaining frequency is referred to as a carrier envelope offset (CEO) $f_{CEO}$. The carrier envelope offset $f_{CEO}$ is equivalent to a reciprocal of a time $T_{CEO}$. A relation expressed in Expression (4) is established among the carrier envelope offset $f_{CEO}$, the phase shift $\phi_{CEO}$, and the time $T_{CEO}$.

[Math. 4]

$$f_{CEO} = \left(\frac{\phi_{CEO}}{2\pi}\right) f_{rep} \quad (4)$$

The frequency of an m-th spectrum of the optical comb is expressed as in Expression (5) using the repetition frequency $f_{rep}$ and the carrier envelope offset $f_{CEO}$ as parameters.

[Math. 5]

$$f(m) = m \times f_{rep} + f_{CEO} \quad (5)$$

That is, by controlling the plurality of spectra (that is, the frequencies) forming the optical comb, it is possible to control the carrier wave or the envelope line and control a frequency distribution and a time width (that is, a time) of the ultrashort optical pulse in the optical pulse train.

Figure 3:
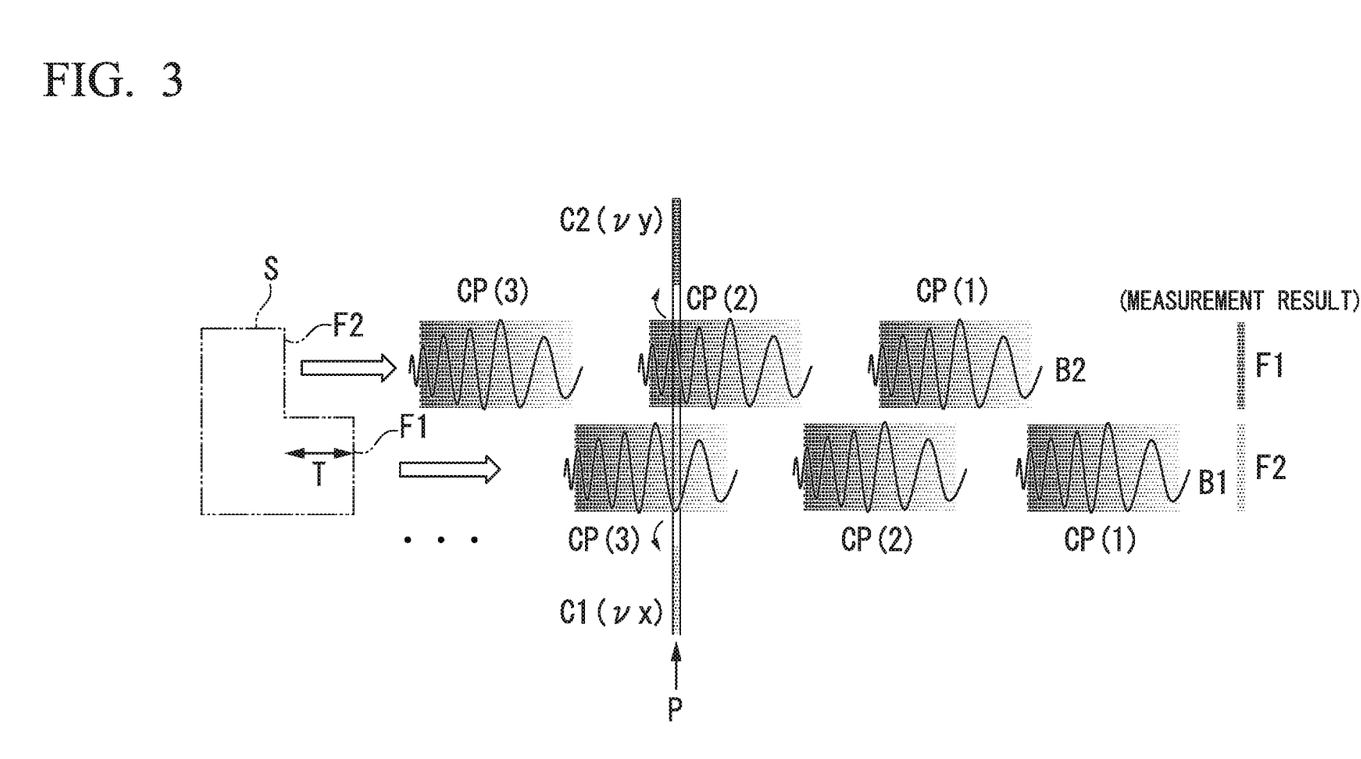
FIG. 3 is a schematic diagram showing a principle of the embodiment of the shape measurement method according to the present invention and a diagram showing a form in which an optical pulse train is reflected from the measurement object.

In the chirped optical pulse train CP(k) shown in FIGS. 1 and 3, a plurality of spectra or the like of the optical comb are modulated so that the frequency of the carrier wave is changed within a time width of each ultrashort optical pulse and color information of each ultrashort optical pulse is developed in time and space. In the present embodiment, it is preferable to modulate and control the plurality of spectra of the optical comb, the carrier wave and the envelope line in consideration of measurement precision sufficient for measurement of an optical shape of a measurement object S and the fact that measurement can be realized at any position without moving a target position.

In the first step, as shown in FIG. 1, the measurement object S is irradiated with the irradiation optical pulse train A0 in which the plurality of chirped optical pulses CP(k) (where k is an integer) with color information are disposed chronologically in the order of a number k (where k=1, 2, 3, . . . , m (where m is an integer)). For example, when the measurement object S has a stepped difference which has a reflection surface such as a mirror surface (for example, when a convex surface F1 and a concave surface F2 shown in FIG. 1 are reflection surfaces), the irradiation optical pulse train A0 preferably irradiates from a direction (that is, the horizontal direction of the sheet surface of FIGS. 1 and 3) substantially perpendicular to the surface direction (that is, the vertical direction of the sheet surface of FIGS. 1 and 3) of the measurement object S. Thus, a simple configuration can be realized by disposing a measurement system in a substantially straight shape. An irradiation angle of the irradiation optical pulse train A0 to the measurement object S, that is, an angle formed by an irradiation direction of the irradiation optical pulse train A0 with respect to an axis (not shown) perpendicular to the surface direction of the measurement object S, is not particularly limited. When the measurement object S has any shape (for example, a shape with a complex curved surface), it is preferable to also efficiently acquire scattered light as light after acted on the measurement object S using an imaging optical system.

(Second Step)

In the second step, in order to measure the optical shape of the measurement object S, a correspondent relation between the numbers k of the optical pulses CP(k) of a plurality of detection target optical pulse trains B1, B2, ..., Bn (where n is an integer) after the chirped optical pulses CP(k) acted on the measurement object S and a correspondent relation between frequency distributions in the chirped optical pulses CP(k) are measured.

In FIGS. 1 and 3, the measurement object S that has a convexo-concave shape in the irradiation direction of the irradiation optical pulse train A0 is exemplified. The measurement object S is made of a material capable of reflecting the irradiation optical pulse train A0. Thus, the irradiation optical pulse train A0 is reflected from the convex surface F1 and the concave surface F2. The optical shape of the measurement object S is not limited to the convexo-concave shape and includes all the optical shapes on which the chirped optical pulses CP(k) are able to be subjected to action, for example, when there is a change in a refractive index or there is a boundary surface in a layer state.

As shown in FIG. 3, since the convex surface F1 projects more than the concave surface F2 in the irradiation direction of the irradiation optical pulse train A0, the correspondent relation between the numbers k of the chirped optical pulses CP(k) of the plurality of detection target optical pulse trains B1, B2, ..., Bn after the chirped optical pulse CP(k) is reflected from the measurement object S and the correspondent relation between frequency distributions (that is, color information) of the chirped optical pulses CP(k) can be obtained on a surface P that has an exit direction of the detection target optical pulse trains B1, B2, ..., Bn as a normal line.

The correspondent relation of the numbers k of the chirped optical pulses CP(k) of the plurality of detection target optical pulse trains B1, B2, ..., Bn can be obtained, for example, using an interferometric measurement, using an interference signal generated when the detection target optical pulse trains B1, B2, ..., Bn interferes in a reference optical pulse train propagating inside a propagation space with a predetermined optical path length.

The chirped optical pulses CP(k) of the detection target optical pulse trains B1, B2, ..., Bn are mutually coherent and can interfere in an optical pulse train (hereinafter referred to as an interference optical pulse train) propagating along a different optical path from that of the detection target optical pulse trains.

As shown in FIG. 3, when the detection target optical pulse trains B1 and B2 are instantaneously cut on the predetermined surface P in a measurement region in accordance with a method such as phase detection or an ultra high-speed shutter, the third chirped optical pulse CP(3) of the detection target optical pulse train B1 and the second chirped optical pulse CP(2) of the detection target optical pulse train B2 are obtained. Accordingly, from the correspondent relation of the numbers k of the chirped optical pulses CP(k) of the detection target optical pulse trains B1 and B2, a shift between the numbers k of the chirped optical pulses CP(k) of the detection target optical pulse trains B1 and B2 is 1, that is, it can be understood that a change in the optical shape equivalent to one chirped optical pulse CP(k) occurs on the convex surface F1 and the concave surface F2. Further, from the correspondent relation between the frequency distributions of the chirped optical pulses CP(k) of the detection target optical pulse trains B1 and B2, it can be understood that a change in the optical shape between the convex surface F1 and the concave surface F2 equivalent to a difference between a frequency vx (that is, a color C1 (vx)) and a frequency vy (that is, a color C2 (vy)) occurs. Then, results measured and detected from the correspondent relation of the numbers k of the chirped optical pulses CP(k) and the correspondent relation between the frequency distributions of the chirped optical pulses CP(k) are matched, and the optical shape of the measurement object S including a thickness dimension T or the like between the convex surface F1 and the concave surface F2 can be measured.

As described above, in the shape measurement method according to the embodiment, a relatively large meter-order change in an optical shape is detected in accordance with the shift of the number k from the correspondent relation of the numbers k of the chirped optical pulses CP(k) of the detection target optical pulse trains B1, B2, ..., Bn by performing the first step and the second step. On the other hand, a change in the optical shape equivalent to a nanometer-order measurement resolution is detected from the correspondent relation between the frequency distributions of the chirped optical pulses CP(k) of the detection target optical pulse trains B1, B2, ..., Bn. Since the correspondent relations are instantaneously detected on the predetermined surface P, that is, at a position on a common space that has an exit direction of the detection target optical pulse trains B1, B2, ..., Bn as a normal line, a femtosecond-order time resolution is obtained. Accordingly, according to the shape measurement method of the embodiment, it is possible to realize the wide measurement range of meter-order, a nanometer-order measurement resolution, and the femtosecond-order time resolution. Multidimensional information regarding the measurement object S is measured at a time.

When a single optical pulse is used as in the related art, the measurement range is determined with the width of a single chirped optical pulse. Therefore, application to a large measurement target on the order of a meter or more is difficult. However, in the shape measurement method according to the embodiment, it is possible to obtain a large measurement range exceeding a limit of a measurement range of the related art.

According to the shape measurement method of the embodiment, by using the optical pulse trains obtained from the optical comb as the irradiation optical pulse train A(0), it is possible to utilize controllability caused by the fact that the time, space, and frequency of an ultrashort pulse of an optical comb mutually have a dense mutual relation to the maximum and it is possible to irradiate the measurement object S with the chirped optical pulses with continuous frequency distributions. According to the shape measurement method of the embodiment, when the optical shape of the measurement object S is measured in the second step, it is possible to easily realize the nanometer-order measurement resolution, the meter-order measurement range, and the femtosecond-order time resolution. By utilizing the above-described controllability to the maximum, it is possible to eliminate trade-off between the measurement resolution and the measurement range in measurement such as a case in which a single optical pulse is used as in the related art (for example, the measurement technology using the 3-dimensional measurement device disclosed in Patent Document 1) and it is possible to easily ensure the measurement resolution and the measurement range.

In measurement such as a case in which a single optical pulse is used as in the related art (for example, the measurement technology using the 3-dimensional measurement device disclosed in Patent Document 1), it is necessary to match a timing at which an image is acquired with a high-speed shutter and a timing at which the chirped optical pulse is reflected, and thus it is necessary to install an object at a position at which measurement can be performed or change the optical path length of a gate optical pulse in a variable stage or the like to change a timing of cutting by a shutter. According to the shape measurement method of the embodiment, by utilizing the above-described controllability of the optical comb to the maximum, it is possible to match the timings precisely and perform the measurement at any position without being associated with a mechanical movement of the stage or the object.

Figure 4A:
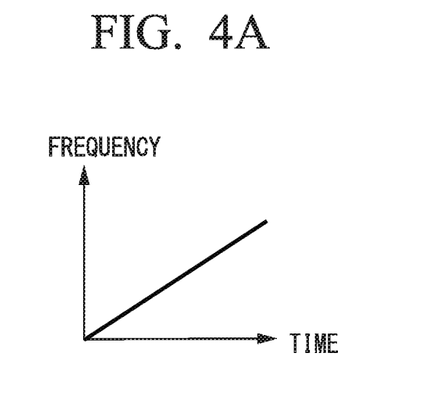
FIGS. 4A and 4B show frequency distributions linearly changing on a time axis.
Figure 4B:
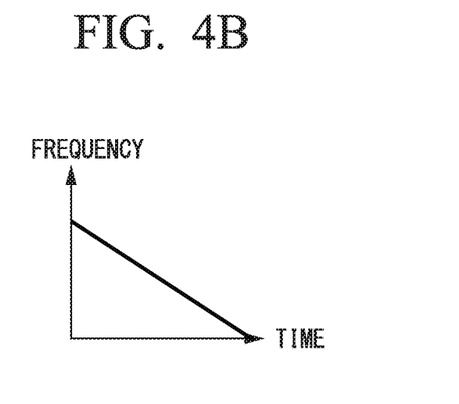
Figure 4C:
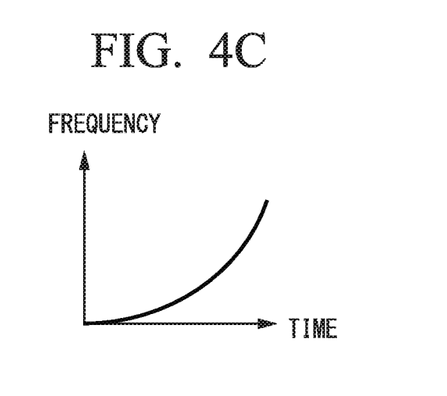
FIGS. 4C and 4D show frequency distributions quadratic functionally changing on the time axis.
Figure 4D:
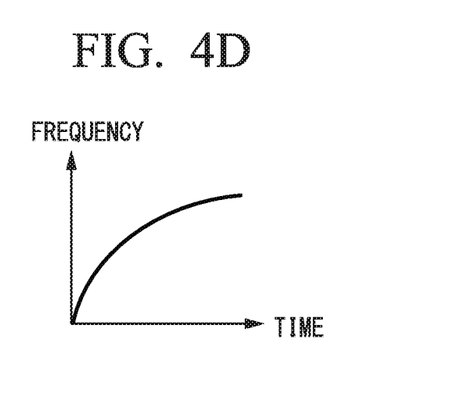
Figure 4E:
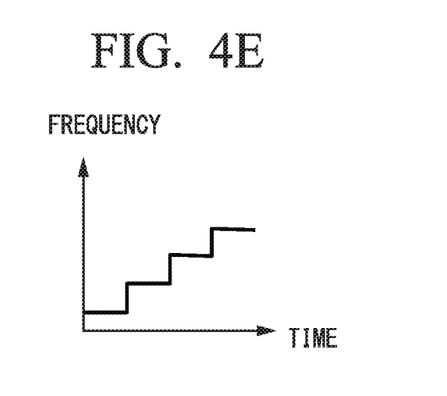
FIGS. 4E and 4F show frequency distributions changing in a stepwise manner.
Figure 4F:
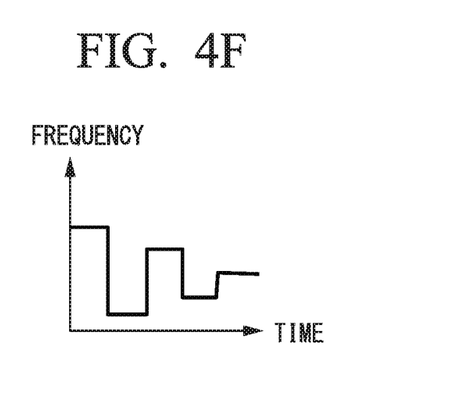

In the embodiment, the chirped optical pulses CP(k) obtained as the optical pulses from the optical comb have been exemplified, but the optical pulses in the shape measurement method according to the invention are not limited to the chirped optical pulses CP(k). The use of the optical pulses that have the linear continuous frequency distributions as shown in FIGS. 4A and 4B because of the continuous spectrum information like the chirped optical pulses CP(k) is more appropriate from the viewpoint that the nanometer-order measurement resolution is obtained, but the relation between a time and the frequency can be measured in advance as a calibration curve without changing the configuration of the device when the time can be determined uniquely from the frequency. Accordingly, as the optical pulses in the shape measurement method according to the invention, optical pulses with frequency distributions increasing or decreasing as a quadratic function on the time axis may be used, as shown in FIGS. 4C and 4D, optical pulses with the frequency distributions changing in a stepwise manner may be used, as shown in FIGS. 4E and 4F, or optical pulses with other frequency distributions may be used.

Next, a shape measurement device according to an embodiment will be described.

In a shape measurement device 10A according to the embodiment, the chirped optical pulses obtained from the optical comb shown in FIG. 2 are assumed to be used as optical pulses as in the shape measurement method according to the embodiment described above.

Figure 5:
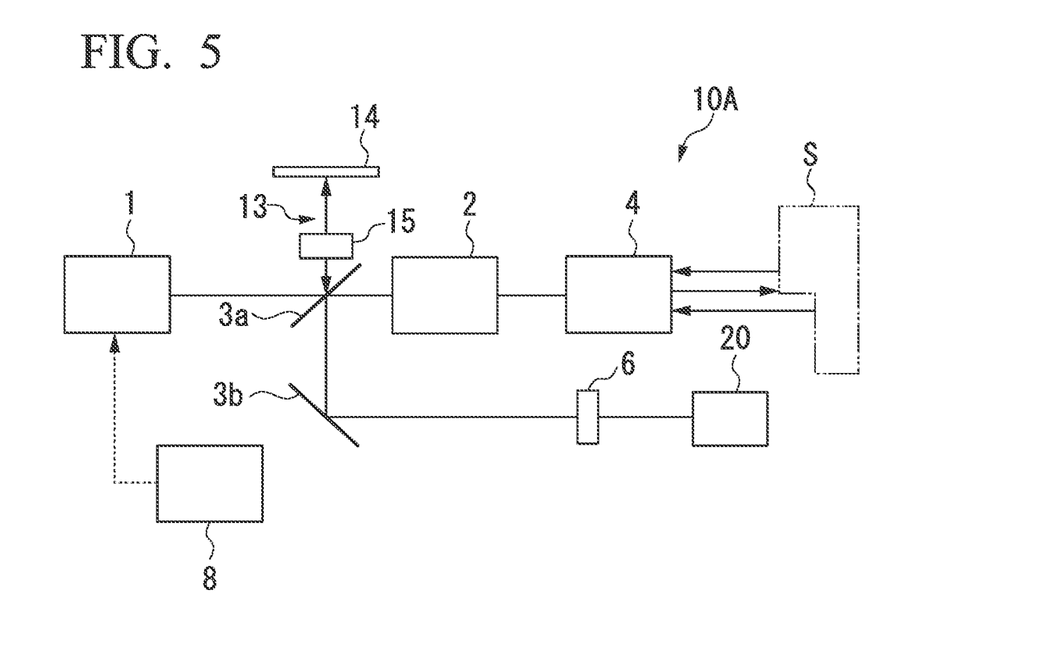
FIG. 5 is a schematic diagram showing a configuration in the embodiment of the shape measurement device according to the present invention.

As shown in FIG. 5, the shape measurement device 10A includes a light source 1 that irradiates a measurement object with an optical pulse train in which a plurality of optical pulses that have predetermined frequency distributions on at least a time axis are disposed chronologically in numerical order and an optical shape measurement part 20 that measures an optical shape of the measurement object in accordance with a correspondent relation between numbers of the optical pulses of a plurality of detection target optical pulse trains after the optical pulses emitted from the light source 1 act on the measurement object S and a correspondent relation between the frequency distributions in the optical pulses.

In the embodiment, the light source 1 is an optical comb light source and is configured to be able to emit an optical comb. The repetition frequency $f_{rep}$ and the carrier envelope offset $f_{CEO}$ of the optical comb emitted from the light source 1 are controlled to be stabilized in accordance with a frequency standard (not shown). The repetition frequency $f_{rep}$ of the optical comb emitted from the light source 1 is controlled by a control unit 8. Under the control of the repetition frequency $f_{rep}$ by the control unit 8, a timing of a shutter 6 is variable, as will be described below.

As the light source 1, for example, a combination of a titanium sapphire laser and a nonlinear optical effect can be used. Specifically, an amplified titanium sapphire laser or the like can be used as a light source and a nonlinear optical effect of water or the like can be used. Chirped optical pulses and an optical pulse train generated by the nonlinear optical effect of water or the like from an optical comb generated by the titanium sapphire laser can be used as an irradiation optical pulse train. The chirped optical pulses generated in this way have a frequency distribution extending over the entire region of the visible light. In the optical pulse train, the above-described chirped optical pulses are repeated chronologically. When chirped optical pulses and a pulse train of the chirped optical pulses generated from a fiber laser and an optical fiber which are more compact and stable practical light sources are used, a practical measurement scheme or device can be realized.

A part of the irradiation optical pulse train A0 emitted from the light source 1 pass a mirror (a beam splitter) 3a, and appropriately chirps an optical pulse of the optical comb emitted from the light source 1 by a chirped optical pulse generation device 2. The optical pulse train in which the plurality of chirped optical pulses of which the frequencies continuously change on the time axis are disposed chronologically in the order of numbers k is emitted from the chirped optical pulse generation device 2. The optical pulse train can be incident on a beam expander 4 and is expanded with a size of a measurement target portion of the measurement object S. The measurement object S is irradiated with the expanded irradiation optical pulse train A0 (not shown in FIG. 5) (see FIG. 3). The plurality of detection target optical pulse trains B1, B2, ..., Bn are obtained in accordance with an action (reflection in FIG. 5) by the optical shape of the measurement object S (see FIG. 3). When the measurement object S allows the irradiation optical pulse train A0 to pass through, a reflection member such as a mirror may be disposed at a predetermined position on the rear side of the measurement object S in a propagation direction of the irradiation optical pulse train A0. When the measurement object S allows the irradiation optical pulse train A0 to pass through, the detection target optical pulse trains B1, B2, ..., Bn may be guided to a mirror 3b at a predetermined distance from the rear side of the measurement object S in the propagation direction of the irradiation optical pulse train A0.

The remainder of the irradiation optical pulse train A0 emitted from the light source 1 is reflected from the mirror 3a, is incident on a gate optical path 13, and is radiated to an optical standard surface 14. The irradiation optical pulse train A0 radiated to the optical standard surface 14 is reflected, propagates along the gate optical path 13, incidents on the mirror 3a.

The detection target optical pulse trains B1, B2, ..., Bn reflected from the measurement object S and incident on the mirror 3a are reflected from the mirror 3a. The detection target optical pulse trains B1, B2, ..., Bn being reflected from the mirror 3a are incident on the mirror 3b along with the remainder of the irradiation optical pulse train A0 being reflected from the optical standard surface and passing through the mirror 3a, are reflected from the mirror 3b, and pass through the shutter 6.

The mirrors 3a and 3b may be changed into beam splitters or the like.

The detection target optical pulse trains B1, B2, ..., Bn passing through the shutter 6 are cut by the shutter 6 driven at a timing determined in accordance with the irradiation optical pulse train A0 (hereinafter referred to as a gate optical pulse train) reflected from the optical standard surface 14 and incident on the optical shape measurement part 20.

As the shutter 6, it is preferable to use, for example, an optical Kerr shutter of a carbon disulfide ($CS_2$) molecular liquid or a high-speed shutter that has a short response time of about femtoseconds (fs) using a nonlinear optical effect and does not have a spatial distribution (that is, the width of a space in an exit direction of the detection target optical pulse train) at an opening or closing time.

When the detection target optical pulse trains B1, B2, ..., Bn are cut and a repetition frequency (an interval of the pulse trains) of the optical comb is changed, a timing at which the gate pulse train arrives at the shutter 6 is changed. Therefore, a timing of cutting by the shutter is changed. In the optical shape measurement part 20, the gate pulse train is adjusted by an optical path length adjustment unit 15 provided in the gate optical path 13 so that a variable range of a timing at which the gate pulse train arrives at the shutter 6 is sufficiently large. Then, from a relation of a change in the frequency of each of the detection target optical pulse trains B1, B2, ..., Bn cut by the shutter 6 at the time of slightly changing the repetition frequency of the optical comb preliminarily, information regarding the number k of the chirped optical pulse CP(k) can be acquired without changing the device configuration of the shape measurement device 10A. At this time, as the number k of the chirped optical pulse CP(k) increases, a rate of change in the frequency of each of the detection target optical pulse trains B1, B2, ..., Bn cut by the shutter 6 at the time of slightly changing the repetition frequency increases. Accordingly, it is possible to calculate the number k in accordance with the rate of change in the frequency of each of the detection target optical pulse trains B1, B2, ..., Bn which are obtained. Then, a shift of the number k is calculated from the correspondent relation between the numbers k of the chirped optical pulses CP(k) of the detection target optical pulse trains B1, B2, ..., Bn based on the obtained numbers k of the chirped optical pulses CP(k) of each of the detection target optical pulse trains B1, B2, ..., Bn which are obtained. Then, a difference in the optical shape of the measurement object S equivalent to the shift of the number k is calculated.

The optical shape measurement part 20 detects a difference between the frequencies of the chirped optical pulses CP(k) of the detection target optical pulse trains B1, B2, ..., Bn based on the information regarding the frequency of each of the detection target optical pulse trains B1, B2, ..., Bn cut by the shutter 6. Then, a difference in the optical shape of the measurement object S equivalent to the difference in the frequency is calculated from the correspondent relation between the frequency distributions of the chirped optical pulses CP(k) obtained from the above-described difference.

Then, the optical shape measurement part 20 measures the optical shape of the measurement object S in accordance with a result calculated from the correspondent relation between the numbers k of the chirped optical pulses CP(k) and the correspondent relation between the frequency distributions of the chirped optical pulses CP(k).

Figure 6:
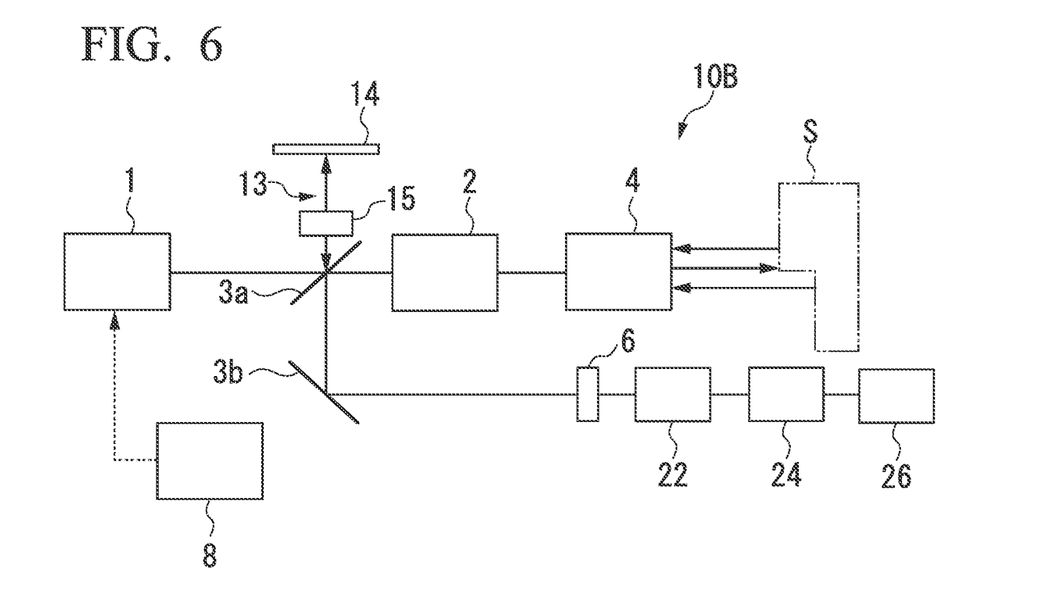
FIG. 6 is a schematic diagram showing a modification example of the configuration in the embodiment of the shape measurement device according to the present invention.

As a modification example of the shape measurement device 10A, a shape measurement device 10B shown in FIG. 6 can be exemplified. In the shape measurement device 10B, a spectrum interference fringe image between the detection target optical pulse trains B1, B2, ..., Bn and the gate pulse trains is acquired and a nature of spectrum interference in which an interval of the interference fringe on the frequency axis at the time of overlapping the pulses is the roughest is used. In the detection target optical pulse train which is chirped, a carrier frequency is changed over time. Therefore, in interference between the detection target optical pulse train which is chirped and the detection target optical pulse train which is unchirped, a time at which the pulse trains are overlapped differs in accordance with frequency. Therefore, an interval of interference fringe is changed in accordance with the optical spectrum (frequency) of the interference signal. As described above, a shutter can be substituted by analyzing optical spectrum dependency of an interference signal between the detection target optical pulse trains B1, B2, ..., Bn and the gate pulse trains and acquiring information regarding the optical frequency of which the interference fringe interval is the roughest. As shown in FIG. 6, first, the spectrum interference fringe between the detection target optical pulse trains and the gate optical pulse trains is spectrally resolved by a diffraction grating or the like in a spectrum resolution unit 22. The spectrum interference fringe which is spectrally resolved is acquired as an image by the interference image acquisition unit 24, an interval of the spectrum interference fringe is acquired by simple analysis in an interference signal processing unit 26, and information regarding the optical frequency forming the interference fringe at the roughest interference fringe interval is acquired.

In the shape measurement device 10B, information regarding the number k of the chirped optical pulse CP(k) is acquired, as will be described below. That is, as in the case of the shape measurement device 10A, a timing between the gate pulse train and each of the detection target optical pulse trains B1, B2, ..., Bn is changed by slightly changing the repetition frequency (an interval of the pulse trains) in advance by using the highly precise controllability of the optical comb. Thereafter, from a relation of a change in the optical frequency with the roughest interval of the interference fringe in the spectrum interference fringe, the information regarding the number k of the chirped optical pulse CP(k) can be acquired without changing the device configuration of the shape measurement device 10B.

The shift of the number k is calculated from the correspondent relation between the numbers k of the chirped optical pulse CP(k) of the detection target optical pulse trains B1, B2, ..., Bn based on the obtained numbers k of the chirped optical pulses CP(k) of each of the detection target optical pulse trains B1, B2, ..., Bn which is obtained. A difference in the optical shape of the measurement object S equivalent to the shift of the number k is calculated.

In the optical shape measurement part 20, the difference in the frequency between the chirped optical pulses CP(k) of the detection target optical pulse trains B1, B2, ..., Bn is detected based on the information regarding the optical frequency with roughest interval of the interference fringe in the spectrum interference fringe of each of the detection target optical pulse trains B1, B2, ..., Bn cut by the shutter 6. Then, the difference in the optical shape of the measurement object S equivalent to the difference in the frequency is calculated from the correspondent relation between the frequency distributions of the chirped optical pulses CP(k) obtained from the above-described difference.

Then, the optical shape measurement part 20 measures the optical shape of the measurement object S in accordance with a result calculated from the correspondent relation between the numbers k of the chirped optical pulses CP(k) and the correspondent relation of the frequency distributions of the chirped optical pulses CP(k).

When this configuration is adopted, there is the advantage that it is not necessary to use the nonlinear optical effect of requiring a high-intensity laser.

As described above, the shape measurement devices 10A and 10B according to the embodiment are able to detect a relatively large meter-order change in the optical shape in accordance with the shift of the number k from the correspondent relation of the numbers k of the chirped optical pulses CP(k) of the detection target optical pulse trains B1, B2, ..., Bn. On the other hand, a change in the optical shape equivalent to the nanometer-order measurement resolution can be detected from the correspondent relation between the frequency distributions of the chirped optical pulses CP(k) of the detection target optical pulse trains B1, B2, ..., Bn. By instantaneously detecting the correspondent relation between the frequency distributions of the chirped optical pulses CP(k) of the detection target optical pulse trains B1, B2, ..., Bn using the shutter 6 and utilizing mutual transformation among time, space, and frequency, it is possible to obtain a femtosecond-order time resolution. Accordingly, according to the shape measurement method of the embodiment, it is possible to realize the large-meter-order measurement range, the nm-order measurement resolution, and the femtosecond-order time resolution.

The shape measurement devices 10A and 10B according to the embodiment can utilizing the time, the space, and the frequency of the ultrashort pulse of the optical comb to the maximum by using an optical comb light source as the light source 1 and can irradiate the measurement object S with the chirped optical pulses with the continuous frequency distributions. Thus, it is possible to easily realize the nanometer-order measurement resolution, the meter-order measurement range, and the femtosecond-order time resolution when the optical shape of the measurement object S is measured. By utilizing the time, the space, and the frequency to the maximum, it is possible to eliminate trade-off between the measurement resolution and the measurement range. Further, it is possible to perform highly precise measurement at any position without a mechanical movement of the stage or the object.

INDUSTRIAL APPLICABILITY

As described above, according to the invention, it is possible to simultaneously realize the nanometer-order measurement resolution, the meter-order measurement range, and the femtosecond-order time resolution and it is possible to measure the optical shape of the measurement object S in non-contact and non-destruction. Accordingly, the invention can be applied to many fields such as an industry field in which a shape measurement with a high aspect ratio is necessary and a biological medical field, such as funduscopic examination, in which highly precise observation in real time is necessary. For example, by using a high-speed time resolution and instantaneously measuring a laser processing state, application to shape measurement of which a state changes at a high speed is possible.

The preferred embodiment of the invention has been described in detail above, but the invention is not limited to specific embodiments. Various modifications or changes can be made within the scope of the gist of the invention described in the claims.

REFERENCE SIGNS LIST

1 Light source
10 Shape measurement device
20 Optical shape measurement part

What is claimed is:

1. A shape measurement method comprising:
    irradiating a measurement object with an optical pulse train comprising a plurality of optical pulses that have predetermined frequency distributions on a time axis are generated chronologically in numerical order; and
    measuring an optical shape of the measurement object using at least two detection target optical pulse trains, each optical pulse in each of the two detection target optical pulse trains having a pulse number, wherein the optical shape of the measurement object is measured in accordance with a difference in the pulse numbers of optical pulses between the at least two detection target optical pulse trains after the optical pulse train irradiating at least two regions of the measurement object acts on the two regions of the measurement object and a frequency difference between the optical pulses,
    wherein, the difference in the pulse number and the difference in the frequency of the optical pulses are instantaneously detected on a same predetermined plane that intersects with paths of the detection target optical pulse trains at the same time.

2. The shape measurement method according to claim 1, wherein the optical pulse train is obtained by controlling a phase of a discrete mode frequency of an optical comb.

3. The shape measurement method according to claim 2, wherein the difference in pulse numbers of the optical pulses of the plurality of detection target optical pulse trains is obtained using an interference signal generated when the detection target optical pulse train and a reference optical pulse train propagating in a propagation space with a predetermined optical path length interfere.

4. The shape measurement method according to claim 1, wherein the difference in pulse numbers of the optical pulses between the at least two detection target optical pulse trains is obtained using an interference signal generated when each of the detection target optical pulse trains and a reference optical pulse train propagating in a propagation space with a predetermined optical path length interfere.

5. The shape measurement method according to claim 1, wherein the plurality of optical pulses are coherent with each other, phases of the optical pulse trains that are adjacent on the time axis are different from each other, and the optical pulse train acts on the two regions of the measurement object, which are different regions of the measurement object.

6. The shape measurement method according to claim 1, wherein the optical pulse train is expanded to a size of a measurement target portion of the measurement object before the measurement object is irradiated.

7. A shape measurement device comprising:
    a light source, wherein the light source irradiates at least two regions of a measurement object with an optical pulse train with a plurality of optical pulses that have predetermined frequency distributions on a time axis are disposed chronologically in numerical order;
    a shutter, wherein the shutter cuts out at least two optical pulses of each of at least two detection target optical pulse trains after the optical pulse train emitted from the light source irradiates the at least two regions of the measurement object act on a same predetermined plane that intersects with paths of the detection target optical pulse trains, wherein each optical pulse in each of the two detection target optical pulse trains has a pulse number;

a detector and/or an oscilloscope, wherein the detector and/or oscilloscope detects optical intensities of each of the optical pulses cut out in the predetermined plane and generates an interference signal and an interference fringe interval between each of the detection target optical pulse trains and a reference optical pulse train propagating in a propagation space with a predetermined optical path length;

a computer, wherein the computer measures an optical shape of the measurement object in accordance with a difference in the pulse number of the optical pulses of the at least two detection target optical pulse trains after the optical pulses have been cut out by the shutter and a difference in frequency of the cut out optical pulses, wherein, the computer determines the difference in the pulse numbers of the cut out optical pulses and the difference in the frequency of the cut out optical pulses based on information with regard to a frequency corresponding to the interference fringe interval.

8. The shape measurement device according to claim 7, wherein the light source includes an optical comb capable of emitting the optical pulse train by controlling a phase of a discrete mode frequency.

9. The shape measurement device according to claim 7, wherein the plurality of optical pulses are coherent with each other, phases of the optical pulse trains which are adjacent on the time axis are different from each other, and the optical pulse train acts on the two regions of the measurement object, which are different regions of the measurement object.

10. The shape measurement device according to claim 7, further comprising a beam expander configured to expand the optical pulse train to a size of a measurement target portion of the measurement object before the optical pulse train irradiates the measurement object.

11. The shape measurement device according to claim 7, further comprising:

a diffractive element and a spectrum resolution element that spectrally resolves the interference fringe, wherein, the information is acquired with regard to a frequency of which the interference fringe interval is roughest.

* * * * *